No. 800,137. PATENTED SEPT. 26, 1905.
A. J. BURNS.
FRUIT CORING MACHINE.
APPLICATION FILED SEPT. 23, 1903.
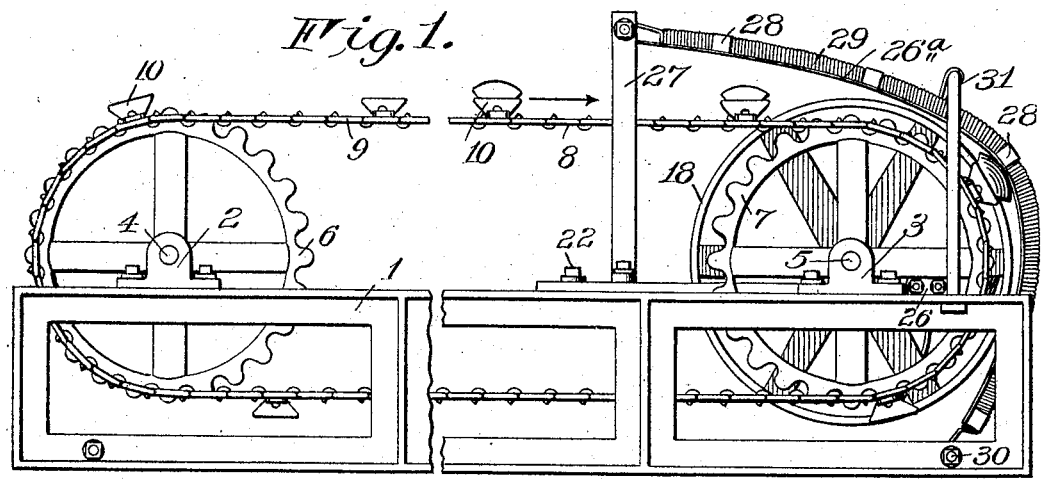
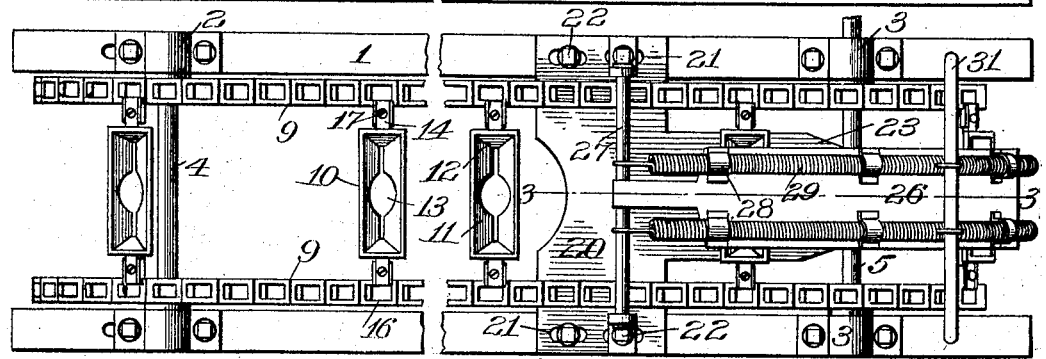
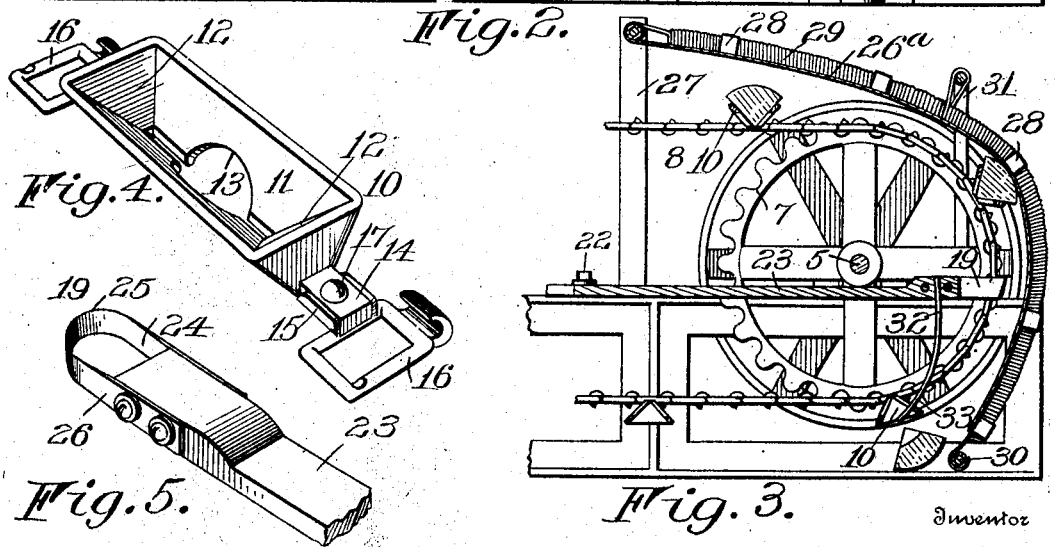
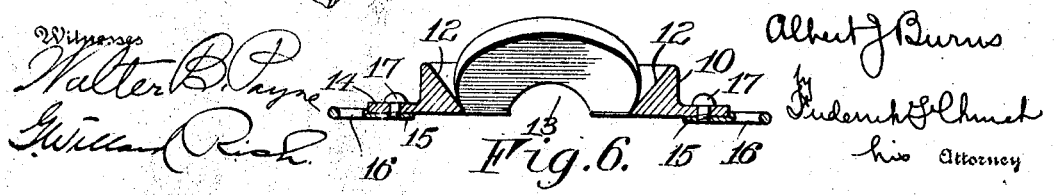

UNITED STATES PATENT OFFICE.

ALBERT J. BURNS, OF ROCHESTER, NEW YORK, ASSIGNOR OF ONE-HALF TO FREDERICK D. H. COBB, OF ROCHESTER, NEW YORK.

FRUIT-CORING MACHINE.

No. 800,137.  Specification of Letters Patent.  Patented Sept. 26, 1905.

Application filed September 23, 1903. Serial No. 174,284.

*To all whom it may concern:*

Be it known that I, ALBERT J. BURNS, of Rochester, in the county of Monroe and State of New York, have invented certain new and useful Improvements in Fruit-Coring Machines; and I do hereby declare the following to be a full, clear, and exact description of the same, reference being had to the drawings forming a part of this specification and to the numerals marked thereon.

The object of my present invention is to provide a fruit-coring machine that is capable of operating upon fruit that has been divided into a plurality of segments for the purpose of removing the core therefrom in an improved manner, that involves a minimum mutilation or waste of the fruit, and that enables the operation to be done rapidly and in a simple manner.

To these and other ends my invention consists in certain combinations and arrangements of parts to be hereinafter more fully explained, the novel features being pointed out in the claims hereunto annexed.

In the drawings, Figure 1 is a side elevation of a machine embodying my invention. Fig. 2 is a plan view of the same. Fig. 3 is a fragmentary sectional view on the line 3 3, Fig. 2. Fig. 4 is a detail perspective view of one of the receptacles removed from the conveyer. Fig. 5 is a similar view of the coring-knife, a portion thereof being omitted; and Fig. 6 is a sectional view showing a segment of fruit centered in the pocket of its receptacle.

Similar parts are designated by the same numerals of reference in the several views.

To facilitate an understanding of my invention, reference will be had to the herein-shown embodiment thereof, wherein—

1 designates a supporting-frame carrying the bearings 2 3, revolubly supporting the shafts 4 5, upon which are mounted wheels 6 7, respectively, over which is adapted to pass an endless conveyer 8. This conveyer in its present form comprises a pair of sprocket-chains 9 9, each running over its corresponding sprocket, and between these carriers 9 9 are arranged a plurality of receptacles 10, disposed at suitable intervals to form a conveyer for carrying forward the articles of fruit to be cored in a manner to be hereinafter more fully described. I have designed a novel form of receptacle that is particularly adapted to facilitate the handling of articles of fruit that have been divided into segments, and in the present embodiment such a device is shown comprising a body portion hollowed out and provided with a pair of inclined sides 11 11, arranged to form a pocket approximately of the contour of a segment of the article of fruit to be operated on. The surfaces 12 12 at each end of the pocket are also inclined inwardly at their lower portions in such a manner that when a segment of an article of fruit is deposited therein the ends thereof will engage and slide upon these inclined surfaces as the article enters the pocket to automatically center itself therein, with its central portion or core exposed by the cut-away portion or aperture 13, formed in the apex of the pocket. Any suitable means may be employed for attaching these receptacles to their carriers 8 9, that shown in the present embodiment employing the projections 14 14, carried by the receptacles resting in clips 15 15 of the links 16 16 of the carrier and secured in position by a screw or other device 17.

18 is a driving-pulley connected to any suitable source of power-supply for operating the conveyer in the direction indicated by the arrow.

Coöperating with the moving receptacles 10 is a relatively stationary coring-knife 19, comprising in the present embodiment the shank or body portion 20, provided with elongated apertures 21 21 to receive the bolts 22 22 for adjustably supporting the knife upon the frame, and extending forwardly from the attaching portion 20 is a tongue 23, the end of which terminates in proximity to the conveyer and is provided with a blade 24. I have devised a novel form of knife that is especially adapted for coring fruit as contemplated by my invention, that form thereof illustrated in the present embodiment comprising a blade of flat steel or other suitable material having the edge 25 thereof sharpened and the arms 26 26 doubled back and secured by screws or other fastening devices to the sides of the tongue 23 in such a manner as to permit it to be readily renewed. In the present embodiment of my invention I have shown a coring-knife of this character extending between the wheels 7 7, with its blade disposed in such a position as to enter the apertures 13 of the receptacles as they are carried along by the conveyer, and thus remove the core from the segment of the article of fruit resting in the pocket of the receptacle.

In practice I have found it desirable to employ some suitable device for retaining the portions of fruit within their receptacles while passing before the coring-knife, and in the drawings I have illustrated a guard that I have employed for such a purpose comprising a flexible shield 26ª, attached at one end to the support 27 and having a plurality of clips 28 arranged in pairs upon the outer periphery thereof to receive the helical springs or other suitable devices 29, attached at one end to the support 27 and at its opposite end to the relatively fixed pin 30, a supplemental support 31 being provided for limiting the motion of the guard toward the conveyer. This guard is arranged to partially encircle the periphery of the wheels 7 7 and to exert through the action of the springs 29 a resilient force upon the portions of fruit tending to press them into the pockets of their receptacles as they are carried past the coring-knife, the guard being so arranged that the portions of fruit may freely drop out of their pockets after passing the coring-knife and while the receptacles assume an inverted position in passing the under side of the wheels supporting the conveyer, or if found necessary any suitable form of ejector may be employed for positively displacing the fruit from their pockets.

A machine of this character constructed in accordance with my invention is especially designed for operating upon apples and similar fruit the core of which is to be removed, wherein each article of fruit is divided in a preliminary operation into any desired number of segments or parts, the cut sides of which will present a substantially V form, in the apex and approximate center of which is located the core to be removed. Each portion or segment of fruit thus formed is fed by hand or other suitable means into the receptacles 10 10 as they are carried along by their carrier in the direction indicated by the arrow, and as they pass beneath the guard 26 a resilient pressure will be exerted thereon tending to retain them in the pockets of the receptacles until after they have passed the coring-knife, and after passing beyond the guard they are free to drop from their receptacles into a suitable hopper or container; but in passing the knife that portion of the fruit extending across and exposed by the aperture 13 and containing the core will be in line with the knife-blade 24, and as they are carried past it said knife will be in such a position as to enter said aperture and remove that portion of the fruit that protrudes through and is exposed by said aperture, thus removing only the core and leaving the remaining portion of the fruit intact. The knife shown in the present embodiment is particularly adapted for coring fruit in this manner, as the fruit will be moved past the knife at such an angle to its cutting edge 25 as to produce a sharp and well-defined cut, and as these blades as constructed are readily removable they may be easily replaced by sharp ones.

If found necessary or desirable, any suitable form of ejector may be employed for positively removing the articles of fruit from their receptacles after the coring operation has been completed, a simple form of ejector being shown in the present embodiment comprising a resilient or spring arm 32, suitably supported at one end as by the relatively stationary knife and having its opposite end 33 free and arranged to enter the apertures 13 of the receptacles and snap against the fruit therein as it passes, causing said fruit to be positively ejected from its pocket after its core has been removed by the coring-knife.

It will be obvious that a machine embodying my invention may be cheaply and easily constructed and in operation will enable the coring to be done quickly and in such a manner that the core alone is removed, leaving the remaining portion of the fruit intact, thereby reducing the waste to a minimum.

I claim as my invention—

1. In a fruit-coring machine, the combination with a frame, and a conveyer movably mounted thereon carrying a plurality of receptacles having angularly-shaped cavities formed to receive sections of articles of fruit to be cored and having apertures communicating with the apexes of said cavities to expose the cores of the fruit, of a coring-knife arranged in the path of said apertures of the receptacles and adapted to remove the core from the fruit contained therein as they move past said knife.

2. In a fruit-coring machine, the combination with a frame, a movable conveyer mounted thereon, and a plurality of receptacles carried by said conveyer and having angularly-shaped cavities to receive segments of fruit to be cored and apertures communicating with the apexes of said cavities to expose the core of the fruit, of a coring-knife extending into the path of the cores of the fruit and apertures of said receptacles and arranged to remove the core from said segments as they pass.

3. In a fruit-coring machine, the combination with a frame and an endless conveyer mounted thereon carrying a plurality of receptacles for receiving the articles of fruit to be cored, of a relatively fixed knife located in the path of the articles of fruit carried by said receptacles and adapted to remove the core from said fruit as it is carried past said knife, and relatively fixed retaining means located opposite to the knife for preventing the displacement of said fruit while passing said knife.

4. In a fruit-coring machine, the combination with a frame, a conveyer movably mounted thereon, and a plurality of receptacles each having a pocket to receive a portion of an article of fruit to be cored, of a coring-knife located at one side of the conveyer and adapted to engage the fruit as it is carried past it to remove the core therefrom, and a relatively fixed spring-arm located in the path of the receptacles and at the same side of the conveyer for removing the fruit from said pockets.

5. In a fruit-coring machine, the combination with a frame, a movable carrier supported thereby, and a plurality of receptacles each having an angularly-shaped pocket formed therein to receive a segment of fruit to be cored, and an aperture formed in the apex of each pocket to expose the core of the fruit contained therein, of a coring-knife adapted to enter said aperture and remove the core of said fruit as it is carried past said knife.

6. In a fruit-coring machine, the combination with a frame, a movable carrier supported thereby, and a plurality of receptacles carried by said carrier each having a pocket having inclined sides for centering a segment of an article of fruit to be cored, and a cut-away portion formed in the apex of the pocket of each receptacle arranged to expose the core of the fruit, of a relatively stationary knife adapted to extend into the cut-away portions of said receptacles to remove the core from the fruit as it is carried past said knife, and retaining means for preventing the displacement of said fruit while passing said knife.

7. In a fruit-coring machine, the combination with a carrier and a plurality of receptacles carried thereby each having a pocket formed therein having inclined side walls to engage the lateral surfaces of a segment of fruit, and inclined end surfaces to engage the ends of said fruit to cause it to center itself within said pocket, an aperture being formed in the side walls to expose the core of the fruit, of a knife having a blade adapted to enter said aperture and remove the core of the fruit, while being carried past said knife.

8. In a fruit-coring machine, the combination with a movable carrier, and a plurality of receptacles mounted thereon having pockets formed therein to receive the fruit to be cored, of a relatively stationary knife arranged to remove the core from the fruit as it is carried past it, and a flexible shield extending transversely opposite to the knife and on either side thereof for yieldingly engaging said fruit to retain it within its pocket while passing said knife.

9. In a machine of the character described, a receptacle for receiving segmental portions of fruit, having a pocket having side walls inclined inwardly, and end surfaces also inclined inwardly to engage the ends of the segment of fruit and thereby center it within the pocket, and an aperture formed in the side walls and so disposed as to expose the core of the fruit segment lying within the pocket.

10. In a fruit-coring machine, the combination with a movable carrier having a plurality of receptacles for carrying the fruit to be cored, of a coring-knife for removing the core from the fruit, and a flexible arm, located beyond the knife fixed at one end and having a portion adapted to spring into the receptacles as they are carried past it to remove the fruit therefrom.

11. In a fruit-coring machine the combination with a frame, a movable carrier mounted thereon, and a plurality of receptacles having pockets formed therein to receive the fruit, apertures being formed in the receptacles through which the cores may be removed from the fruit, of a coring-knife for removing the cores of the fruit, and a flexible arm beyond the knife fixed at one end and having a portion extending into the path of the receptacles so as to spring into the apertures therein and eject the fruit therefrom.

12. In a fruit-coring machine, the combination with a frame having relatively fixed supports thereon, a flexible conveyer mounted to move over the supports, and a series of receptacles carried by the conveyer formed to receive portions of fruit to be cored, of a knife located at the inner side of the conveyer having its cutting-blade arranged at one of the conveyer-supports so as to operate upon the fruit of the receptacles as the latter are passing over the support, and a stationary curved shield at the outer side of the conveyer for guiding the fruit past the knife.

13. In a fruit-coring machine, the combination with a frame, a carrier movably mounted thereon and provided with a plurality of receptacles having angularly-shaped pockets to receive segmental portions of the fruit to be cored, an aperture being formed therein and communicating with the pockets to expose the core to be removed, a relatively stationary knife arranged in the path of the fruit at one side of the conveyer and adapted to enter said aperture and remove said core as the fruit is carried past it, and a guard located upon the opposite side of the conveyer adapted to engage the fruit to retain it in position as it is carried past said knife.

14. In a fruit-coring machine, the combination with a frame, a pair of supports over which a carrier is adapted to move, and a plurality of receptacles on said carrier adapted to receive the fruit to be cored and having cut-away portions so disposed as to expose the core to be removed, of a relatively stationary knife located at one side of the conveyer having a blade adapted to enter said cut-away portions to remove said cores as the fruit is carried past it in said receptacles, and a guard located opposite said knife and from the opposite side of the conveyer adapted to engage the fruit to retain it in said receptacles as it is carried between it and said knife and to free itself from the fruit after having passed the knife.

ALBERT J. BURNS.

Witnesses:
G. WILLARD RICH,
CLARENCE A. BATEMAN.